United States Patent [19]

Andō

[11] Patent Number: 4,654,516

[45] Date of Patent: * Mar. 31, 1987

[54] OPTICAL HEAD

[75] Inventor: Hideo Andō, Tokyo, Japan

[73] Assignee: Kabushiki Kaisha Toshiba, Kawasaki, Japan

[*] Notice: The portion of the term of this patent subsequent to Jun. 4, 2002 has been disclaimed.

[21] Appl. No.: 625,792

[22] Filed: Jun. 28, 1984

[30] Foreign Application Priority Data

Jun. 30, 1983 [JP] Japan .................... 58-119389

[51] Int. Cl.$^4$ .............. G01J 1/36; G11B 7/00
[52] U.S. Cl. .................... 250/201; 250/204; 369/44
[58] Field of Search .............. 250/201 AF, 204, 208, 250/209; 369/44, 45, 46

[56] References Cited

U.S. PATENT DOCUMENTS 4,079,248  3/1978  Lehureau ................ 250/201
4,521,680  6/1985  Ando .................. 250/201 DF

FOREIGN PATENT DOCUMENTS 52-42742  4/1977  Japan .
56-133704  10/1981  Japan .

Primary Examiner—Gene Wan
Attorney, Agent, or Firm—Cushman, Darby & Cushman

[57] ABSTRACT

In an optical head, a laser beam emitted from a laser unit is converged by an objective lens and is projected toward a light reflecting layer of an optical disk. The laser beam reflected by the light reflecting layer is directed toward a light shielding plate through the objective lens. One part of the laser beam is shielded by the light shielding plate, and the other part thereof is converged by the projection lens and is projected on the photo sensitive regions. When the objective lens is kept in the just in-focusing state, a differential signal between photo signals generated from the photo sensitive regions is maintained at zero level. The differential signal is set at zero level when the objective lens is located at a transition point corresponding to a distance $\delta tf$ within the defocusing range. The beam spot formed by the light beam when the objective lens is located in the transition point extends outside the photo sensitive regions. In this case, an area Sout of a beam spot portion outside the photo sensitive regions is set to be a value 3Sin which is three times an area of a beam spot portion Sin within the photo sensitive regions.

17 Claims, 19 Drawing Figures

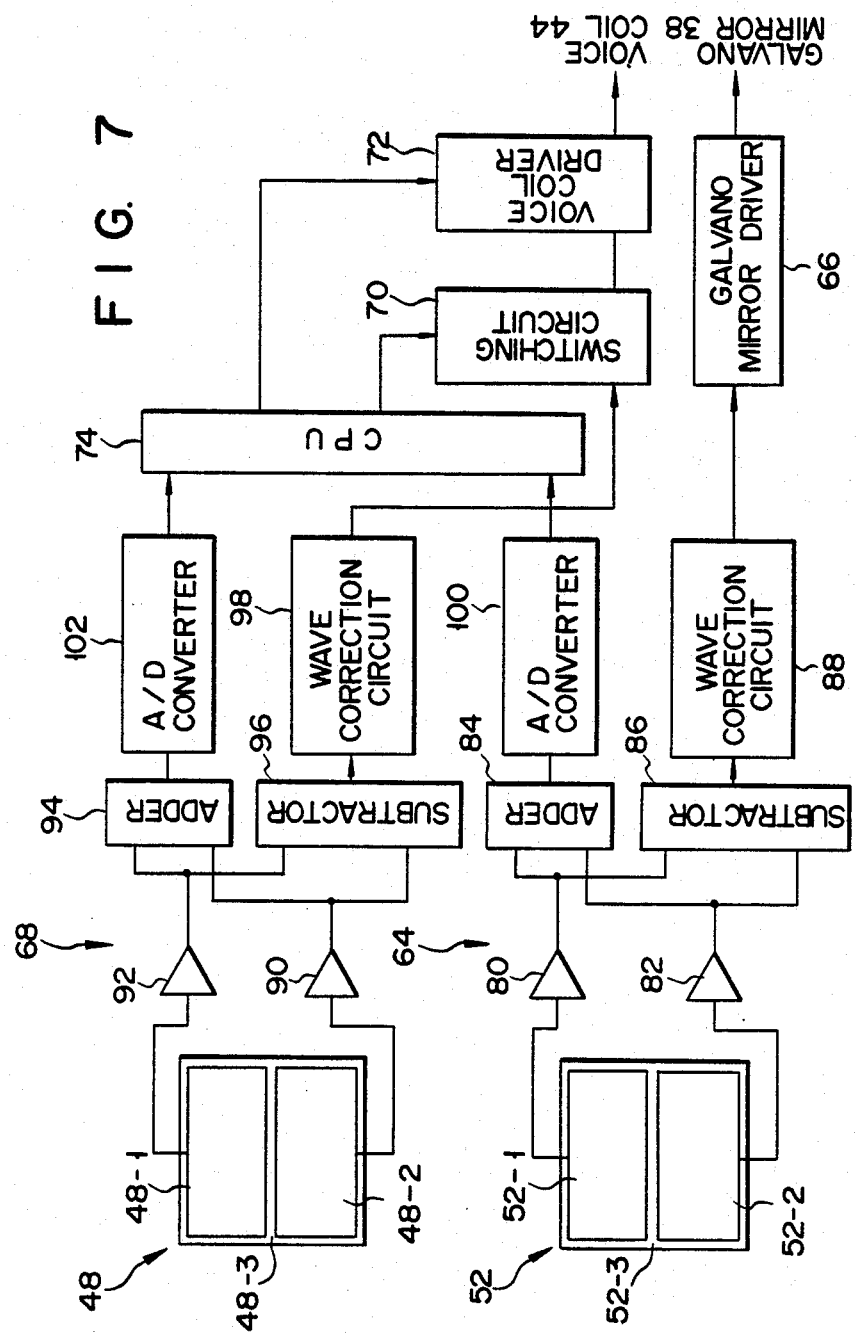

OPTICAL HEAD

BACKGROUND OF THE INVENTION

The present invention relates to an optical head for writing and focusing a light beam for reading information to and from an information recording medium such as an optical disk, and moe particularly, to an improvement in a photo detector for an optical head for detecting a defocusing state of the light beam.

Various optical information recording/reproduction systems have been recently devised which optically write and read information on and from an information recording medium (to be referred to as an optical disk hereinafter). For example, information recording/reproduction systems are known which are used for a recording medium for reproduction only such as a CD (compact disk) type of DAD or a video disk, an image file, a still image file, a COM (computer output memory) or the like.

In such systems, information is recorded by establishing a state change such as forming a hole (pit) in a recording layer by a focused light beam. In other information recording/reproduction systems, information is optically written on or read from an information recording medium for recording/reproduction or from an erasable information recording medium (to be referred to as an optical disk hereinafter). In these systems, in both the write and read modes, a light beam must be always focused on the optical disk. In other words, the beam waist of the light beam must be coincident with the optical disk surface, and a minimum-sized beam spot must be formed on the optical disk. In view of this requirement, the optical head frequently has a focus detecting system for detecting the state of focus of the light beam. Various such focus detecting systems have been proposed. For example, U.S. Ser. No. 399,873, filed on July 19, 1982 (now U.S. Pat. No. 4,521,680) and corresponding EPC application No. 82106508.3 filed on July 19, 1982 disclose a focus detecting system adopting the so-called knife edge method.

In this focus detecting system adopting the knife edge method, as shown in FIG. 1, a laser beam is reflected from a recording layer or light reflecting layer 10 on which information is to be or is already recorded. An objective lens 2, a knife edge 4, a convergent lens 6 and a photo detecting unit 8 are arranged on an optical path 0-0 of the reflected light from the recording layer 10. The knife edge 4 serves to allow passage of only that laser beam component which is spaced apart from the optical axis 0-0. The photo detecting unit 8 detects a laser beam which is converged by the convergent lens 6. The photo detecting unit 8 has two, first and second, photo sensing regions or photo sensitive regions 8-1 and 8-2, and is located at the back focal point of the convergent lens 6. In such a focus detecting system, the defocusing state is not detected by a change in the beam spot size on the photo detecting unit 8 but is detected by a deviation in the beam spot position in a direction 9. In the just in-focusing state, the beam spot is formed at the boundary between the two photo sensivity regions 8-1 and 8-2 of the photo detecting unit 8. A differential signal of the two photo signals from these regions 8-1 and 8-2 is kept substantially zero. In contrast to this, when the objective lens 2 draws too near to the recording layer 10 or is spaced too far apart therefrom, resulting in the defocusing state, the differential signal of the signals from the first and second photo sensitive regions 8-1 and 8-2 changes in the positive or negative direction. The level of this differential signal depends on the distance between the objective lens 2 and the recording layer 10, as shown in FIG. 2.

Referring to FIG. 2, the differential signal level is plotted along the ordinate and the distance from the just in-focusing state position is plotted along the abscissa. A direction away from the recording layer is designated as a positive direction, and a direction toward the recording layer is designated as a negative direction.

In the system described above, the following problem is presented. When the objective lens 2 is moved from the just in-focusing state position exceeding a distance δa in the direction away from the recording layer, the beam spot on the photo detecting unit 8 is formed in the photo sensitive region 8-1, and a negative differential signal is generated by the photo detecting unit 8 in the same manner as in the case wherein the objective lens 2 is too close to the recording layer 10.

The above problem is also presented in a focus detecting system adopting an astigmatic optical system, in addition to the focus detecting optical system adopting the knife edge method. In the focus detecting system employing the astigmatic optical system, as shown in FIG. 3, a cylindrical lens 12 is arranged between a projection lens 6 and a photo detector or photo detecting unit 8, and a change in shape of the beam spot on the photo detector 8 is detected so as to determine whether an objective lens 2 is maintained in the just in-focusing state or the defocusing state. When the objective lens 2 is kept in the just in-focusing state, a circular beam spot is formed on the photo detector 8. However, when the objective lens 2 is kept in a defocusing state, an elliptical beam spot is formed on the photo detector 8. A focusing signal is generated in accordance with the shape of the beam spot. In such a system, since the projection lens 6 is combined with the cylindrical lens 12, these lenses have two focal points. A laser beam projected from the cylindrical lens 12 has two convergent points. Therefore, although the objective lens 2 is greatly removed from the light reflecting layer 10 and is kept in the defocusing state, a circular beam spot is formed on the photo detector 8, thus erroneously detecting that the objective lens 2 is kept in the just in-focusing state.

SUMMARY OF THE INVENTION

It is an object of the present invention to provide an optical head capable of accurately detecting that an objective lens is kept in a defocusing state even if the objective lens is greatly removed from a recording layer by a distance exceeding a predetermined defocusing distance.

In order to achieve the above object of the present invention, there is provided an optical head for focusing a light beam on a light-reflecting surface having means for generating a light beam;

means for transferring the light beam;

an objective lens which converts the transferred light beam into a convergent light beam with a beam waist, projects the light beam on the light-reflecting surface and transmits the light beam reflected from the light-reflecting surface;

a photo detector having photo sensitive regions to which the light beam is directed and which generates photo signals; and means for processing the photo signals and generating a focusing signal dependent on a position of said objective lens, the focusing signal being set at substantially zero level when said objective lens is located at a transition point excluding a predetermined position of a just in-focusing state, whereby a beam spot extends outside the photo sensitive regions of said photo detector when said objective lens is located at the transition point.

BRIEF DESCRIPTION OF THE DRAWINGS

FIG. 7 is a detailed block diagram showing a focusing signal generator and a tracking signal generator;

DETAILED DESCRIPTION OF THE PREFERRED EMBODIMENT

Figure 1:
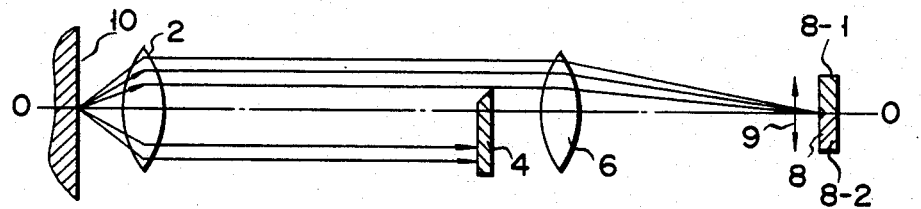
FIG. 1 shows an optical system of a conventional optical head adopting the knife edge method.
Figure 2:
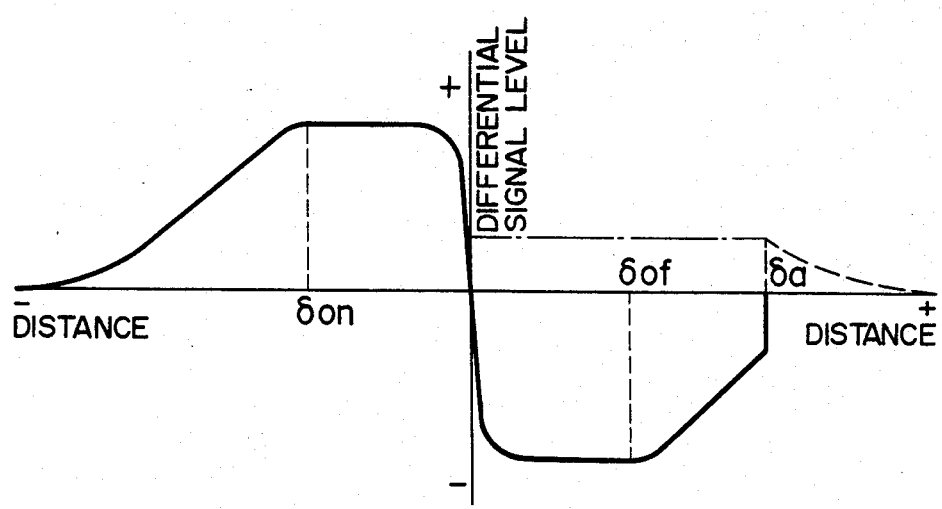
FIG. 2 is a graph showing the relationship between a differential signal obtained from the photo detecting unit shown in FIG. 1 and the distance between the objective lens and the optical disk.
Figure 3:
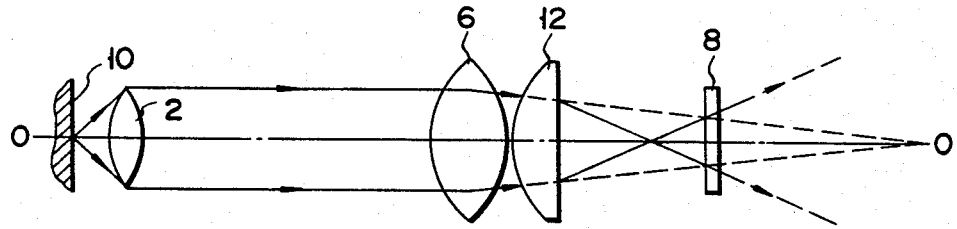
FIG. 3 shows an optical system of a conventional optical head adopting the astigmatic method.

An optical system for recording and reproducing information using an optical head of the present invention will now be described with reference to FIG. 4. An optical disk 14 is obtained by adhering together a pair of disk-shaped transparent plates 20-1 and 20-2 through inner and outer spacers 18-1 and 18-2. Information recording layers or light reflecting layers 16-1 and 16-2 are formed by deposition on the inner surfaces of the respective transparent plates 20-1 and 20-2. Tracking guides are formed helically or concentrically on each of the light reflecting layers 16-1 and 16-2. Information is recorded on these tracking guides in the form of pits. A hole is formed at the center of the optical disk 14. When the optical disk 14 is placed on a turntable 22, a center spindle 23 of the turntable 22 extends through this central hole of the optical disk 14, so that the centers of rotation of the turntable 22 and the optical disk 14 are aligned. A chuck device 21 is mounted on the center spindle 23 of the turntable 22 and fixes the optical disk 14 on the turntable 22. The turntable 22 is rotatably supported on a support base (not shown), and is driven at a constant speed by a drive motor 24.

An optical head 26 is arranged to be movable in the radial direction of the optical disk 14 by means of a linear actuator 28 or a rotary arm. A laser 30 for generating a laser beam is arranged inside the optical head 26. When information is to be written on the optical disk 14, the laser 30 generates a laser beam which has an intensity modulated in accordance with such information. When the recorded information is to be read from the optical disk 14, a laser beam having a constant intensity is generated from the laser 30. The laser beam from the laser 30 is diverged by a concave lens 32, collimated by a convex or collimator lens 34 into parallel light rays, and directed toward a polarization beam splitter 36. The parallel laser beams reflected by the polarization beam splitter 36 are reflected by a galvano mirror 38, become incident on an objective lens 42 through a ¼ wave plate 40 and are converged toward the light reflecting layer 16-2 of the optical disk 14 by the objective lens 42. The objective lens 42 is supported by a voice coil 44 to be movable along the optical axis. When the objective lens 42 is located at a predetermined position, the beam waist of the converged laser beam from the objective lens 42 is projected onto the surface of the light reflecting layer 16-2 to form a minimum-sized spot on the surface of the light reflecting layer 16-2. In this state, the objective lens 42 is kept in the just in-focusing state to allow read and write of information. When information is written, pits are formed on the tracking guides or preformed grooves on the light reflecting layer 16-2 by an intensity-modulated laser beam. When information is read out, a laser beam having a constant intensity is intensity-modulated by the pits formed in the tracking guides and is reflected thereby.

The divergent laser beam reflected from the light reflecting layer 16-2 of the optical disk 14 is converged by the objective lens 42, which are reflected by the galvano mirror 38 and returned to the polarization beam splitter 36 through the ¼ wave plate 40. When the laser beam is returned back through the ¼ wave plate 40, the polarization plane is rotated through 90° as compared to that when the laser beam is reflected by the polarization beam splitter 36. This returned laser beam whose polarization plane is rotated through 90° is not reflected by the polarization beam splitter 36 and passes therethrough. The laser beam emerging from the polarization beam splitter is split by a half mirror 50. One part of the split beam is irradiated onto a first photo detecting unit 52 having photo sensitive regions 52-1, 52-2 through a convex lens 54. First signals from the first photo detecting unit 52, containing information recorded on the optical disk 14 are supplied to a signal processor 56, and are converted into digital data. The first signals are also supplied to a tracking signal generator 64 which generates a tracking signal after processing the received signals. The tracking signal is supplied to a galvano mirror driver 66, thus adjusting the inclination of the mirror 38. As a result the laser beam is directed to the tracking guide and the beam spot is accurately positioned along the tracking guide on the light reflecting layer 16-2.

The other part of the split beam from the half mirror 50 is subjected to extraction by a light shielding plate or a knife edge 58 to extract only a component passing through a region spaced apart from an optical axis 60. The extracted component is passed through a projection lens 62 and becomes incident on a second photo detecting unit 48. The light shielding plate 58 may be replaced by a prism, an aperture or a slit and may be located between the projection lens 62 and the second photo detecting unit 48. A signal from the second photo detecting unit 48 is processed by a focusing signal generator 68. A focusing signal from the focusing signal generator 68 is supplied to a voice coil drive circuit 72 through a switching circuit 70. In response to the focusing signal, the voice coil drive circuit 72 drives the voice coil 44 and keeps the objective lens 42 in the just in-focusing state.

In the optical system described above, when the objective lens 42 is in the position corresponding to a predetermined defocusing deviation or displacement, the switching circuit 70 is turned on in response to an ON signal supplied from a CPU 74. Therefore, the focus servo loop consisting of the voice coil 44, the voice coil drive circuit 72, the focusing signal generator 68 and the second photo detecting unit 48 is closed, so that the objective lens 42 is moved to the optimal position. However, as will be described in detail later, when the objective lens 42 comes closer than a predetermined distance to the optical disk 14, or is spaced apart from the optical disk 14 by a distance exceeding a predetermined distance, the level of the added signal supplied to the CPU 74 from the focusing signal generator 68 or the tracking signal generator 64 becomes lower than the predetermined value. The CPU 74 detects this decrease in level of the added signal and supplies an OFF signal to the switching circuit 70. As a result, the switching circuit 70 is turned off to open the focus servo loop. When the focus servo loop is opened, an alarm signal from the CPU 74 actuates the voice coil drive circuit 72. The objective lens 42 is shifted to the initial position at the predetermined distance from the light reflecting layer 16-2. After the objective lens 42 has been moved toward the light reflecting layer 16-2 to the predetermined distance therefrom, the servo loop is closed again.

The optical system illustrated in FIG. 4 will now be described in detail with reference to FIG. 5 and FIG. 6A to FIG. 6C.

Figure 4:
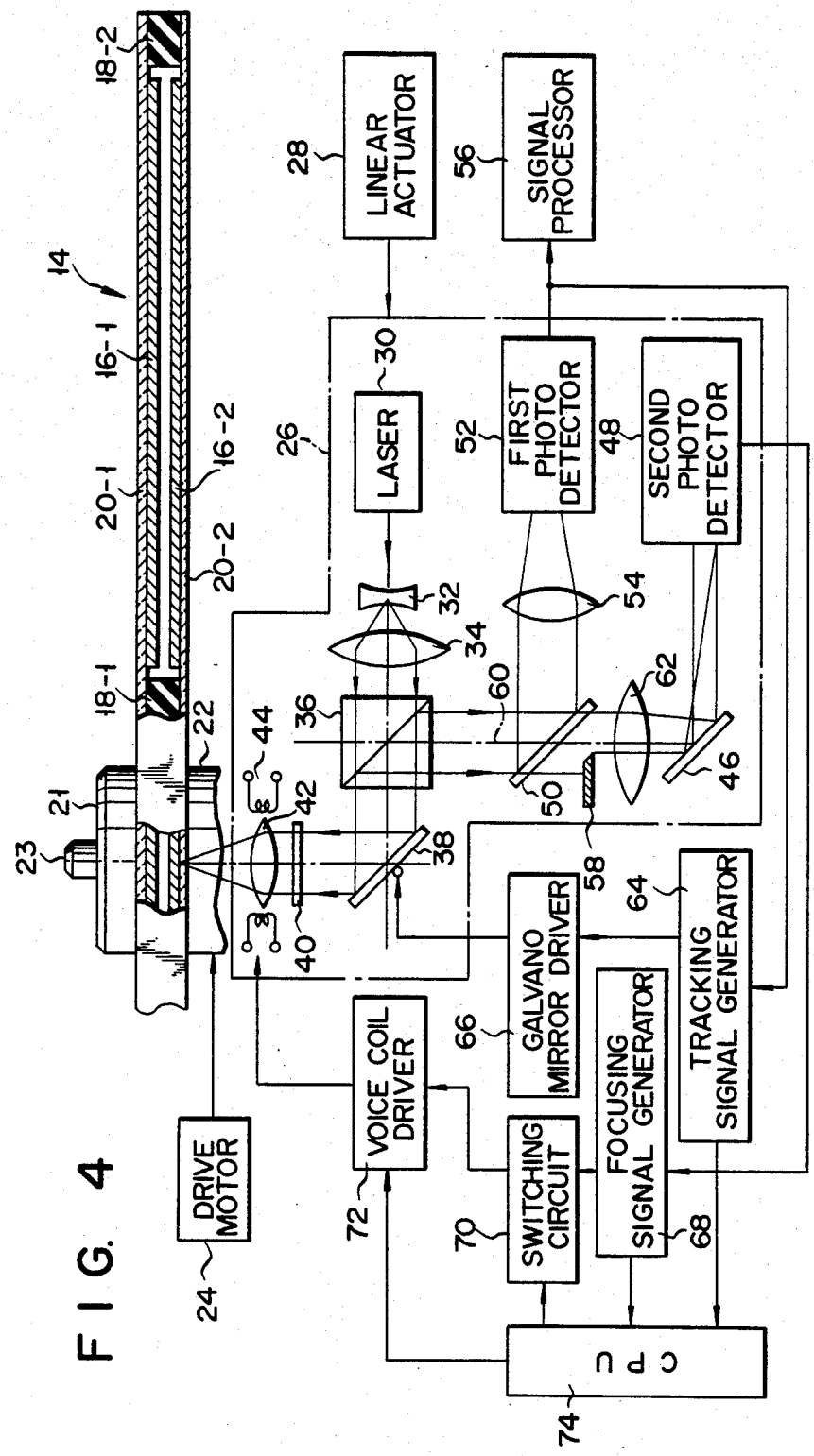
FIG. 4 is a block diagram of an optical system in which the optical head of the present invention is assembled.
Figure 5:
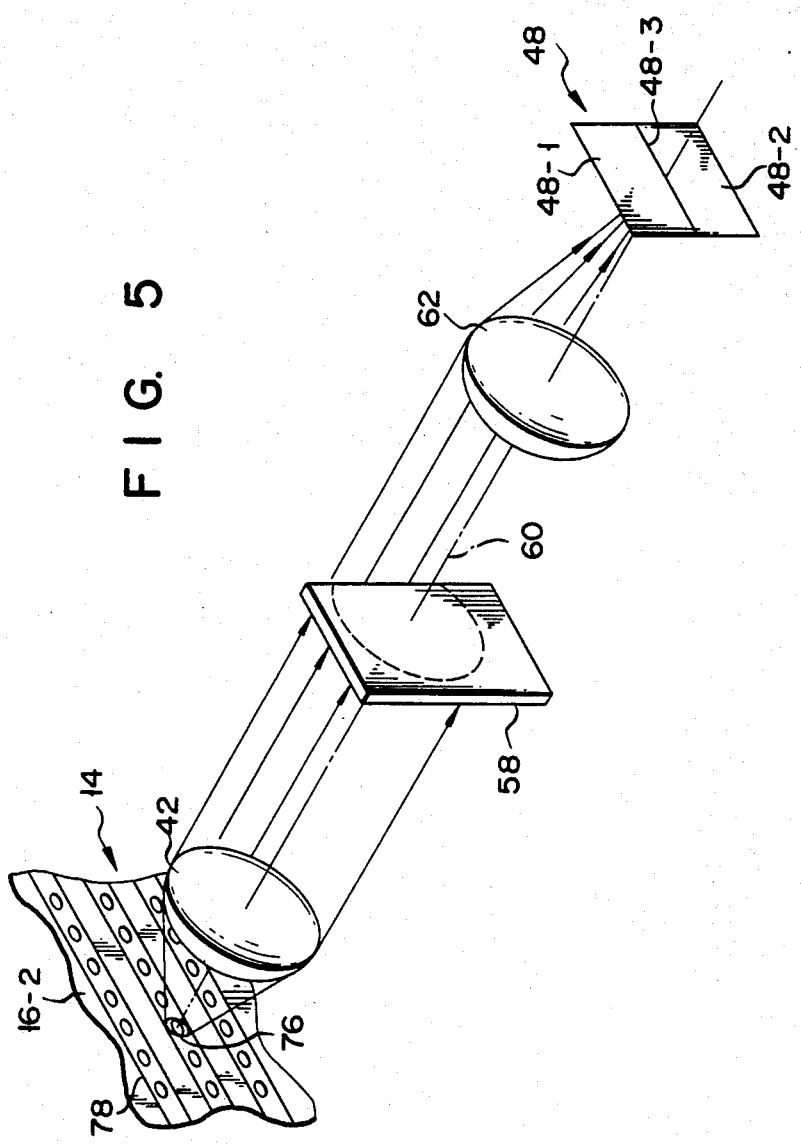
FIG. 5 is a simplified view of the optical system of the optical head shown in FIG. 4.
Figure 6A:
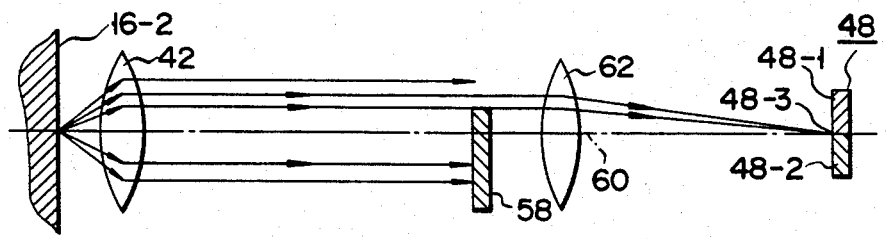
FIGS. 6A to 6D show a path of a light beam in the optical system shown in FIG. 5 in the just in-focusing state and in various defocusing states.
Figure 6B:
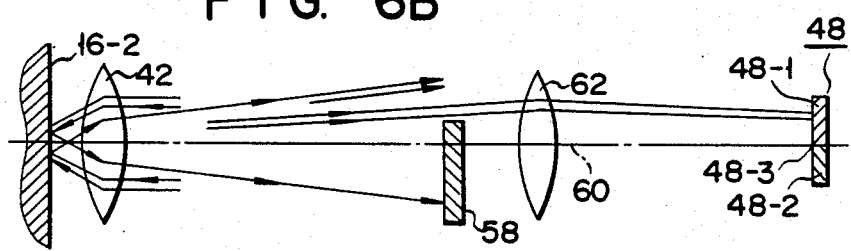
Figure 6C:
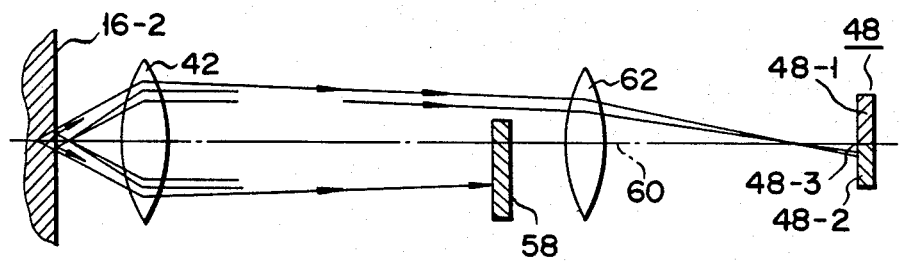

The optical system for detecting the just in-focusing state shown in FIG. 4 is shown simplified in FIG. 5. The path of the laser beam associated with the just in-focusing state and with defocusing states within a defocusing allowance is drawn as shown in FIGS. 6A to 6C. When the objective lens 42 is in the just in-focusing state, the beam waist is projected onto the light reflecting layer 16-2. A minimum-sized beam spot, i.e., the beam waist spot 76 or a spot slightly larger than this spot, is formed on the light reflecting layer 16-2. Since the laser beam which becomes incident on the objective lens 42 from the laser unit 30 consists of parallel rays, the beam waist is formed at the focal point of the objective lens 42. However, if the laser beam incident on the objective lens 42 from the laser 30 is slightly divergent or convergent, the beam waist is formed in the vicinity of the focal point of the objective lens 42. In the optical system shown in FIGS. 4, 5, and 6A to 6C, photo sensitive regions 48-1 and 48-2 and a photo insensitive region 48-3 of a photo detecting unit 48 are on or only slightly deviated from the image forming plane of the beam waist spot 76 in the just in-focusing state. Therefore, in the just in-focusing state, the beam waist spot image or pattern is formed on the photo insensitive region 48-3 between the photo sensitive regions 48-1 and 48-2 of the photo detecting unit 48. Thus, as shown in FIG. 6A, the beam waist spot 76 is formed on the light reflecting layer 16-2. The laser beam reflected by the light reflecting layer 16-2 is converted into parallel light rays by the objective lens 42, and the parallel light rays are directed to the light shielding plate 58. Part of the parallel light rays are blocked by the light shielding plate 58 and the other light component is extracted by the light shielding plate 58, focused by the projection lens 62, and focused to a minimum diameter on the photo detecting unit 48. Thus, the beam waist spot image or pattern is formed on the photo detecting unit 48. At this time, the levels of the signals from the photo sensitive regions 48-1 and 48-2 of the photo detecting unit 48 are kept to be substantially the same. When the objective lens 42 draws closer to the light reflecting layer 16-2, the beam waist is formed after reflection of the laser beam by the light reflecting layer 16-2, as shown in FIG. 6B. Thus, the beam waist is formed between the objective lens 42 and the light reflecting layer 16-2. In this defocusing state, the beam waist is generally formed within the focal length of the objective lens 42. As may be apparent, assuming that the beam waist serves as a light spot, a laser beam reflected by the light reflecting layer 16-2 and emerging from the objective lens 42 is converted into a divergent laser beam by the objective lens 42. Since the laser beam component extracted by the light shielding plate 58 is also divergent, even after being converged by the projection lens 62, it is not focused to a minimum size on the regions 48-1, 48-2 and 48-3 of the photo detecting unit 48, but is focused at a point further away than the photo detecting unit 48. Accordingly, such a laser beam component is projected onto the photo detecting unit 48 in a region above the optical axis 60. A beam spot image or pattern larger than the beam waist spot image is formed on the regions 48-1 to 48-3. A signal from the first photo sensitive region 48-1 becomes lower in level than that from the second photo sensitive region 48-2. A differential signal of the two signals is generated by the focusing signal generator 68 as a focusing signal. When the objective lens 42 draws even closer to the light reflecting layer 16-2, a larger beam spot image or pattern is formed extending beyond the first photo sensitive region 48-1. When the objective lens 42 is spaced apart from the light reflecting layer 16-2, as shown in FIG. 6C, the laser beam is reflected by the light reflecting layer 16-2 after forming a beam waist. In such a defocusing state, the focal length of the objective lens 42 generally lies beyond the beam waist which is formed between the objective lens 42 and the light reflecting layer 16-2. The reflected laser beam directed toward the light shielding plate 58 from the objective lens 42 is thus convergent. The laser beam extracted by the light shielding plate 58 is further converged by the projection lens 62 and is projected onto the regions 48-1, 48-2 and 48-3 of the photo detecting unit 48 after forming a beam waist spot. As a result, a pattern larger than the beam waist spot image is formed in the regions 48-2 and 48-3 of the photo detecting unit 48.

The tracking signal generator 64 and the focusing signal generator 68 will now be described with reference to FIG. 7. The photo signals respectively generated from the first and second photo sensitive regions 52-1 and 52-2 of the first photo detecting unit or detector 52 are amplified by preamplifiers 80 and 82, respectively, and the amplified signals are supplied to both an adder 84 and a subtractor 86. A differential signal of the two photo signals generated from the subtractor 86 is wave-shaped by a wave correction circuit 88 and is supplied as a tracking signal to the galvano mirror driver 66. Therefore, when the galvano mirror driver 66 drives the glavano mirror 38, the laser beam is reflected by the glavano mirror 38 and is directed toward a tracking guide 78. Thus, the tracking guide 78 is traced by the laser beam. The photo signals respectively generated from the first and second photo sensitive regions 48-1 and 48-2 of the second photo detecting unit or detector 48 are amplified by preamplifiers 90 and 92, respectively, and amplified signals are supplied to both an adder 94 and a subtractor 96. A differential signal of the two photo signals generated by the subtractor 96 is wave-shaped by a wave correction circuit 98 and is supplied as a focusing signal to the voice coil drive circuit 72 through the switching circuit 70. Therefore, when the voice coil drive circuit 72 drives the voice coil 44, the objective lens 42 is shifted along the optical axis 60 and kept in the just in-focusing state. An output signal from the adder 84 for adding the two photo signals from the first detecting unit 52 is supplied to the CPU 74 through an A/D converter 100. An output signal from the adder 94 for adding the two photo signals from the second photo detecting unit 48 is also supplied to the CPU 74 through an A/D converter 102. When one or both of the levels of the output signals from the adders 84 and 94 exceed the predetermined level, the CPU 74 detects that the objective lens 42 is in a defocusing state within the defocusing allowance, and generates an ON signal to turn on the switching circuit 70. Conversely, when one or both of the levels of the output signals from the adders 84 and 94 are lower than the predetermined level, the CPU 74 detects that the objective lens 42 is in the defocusing state outside the defocusing allowance, and turns off the switching circuit 70 to open the focusing servo loop. At this time, the CPU 74 supplies an alarm signal to the voice coil drive circuit 72 to drive the voice coil 44 such that the objective lens 42 is moved to the predetermined position within the defocusing allowance.

Figure 6D:
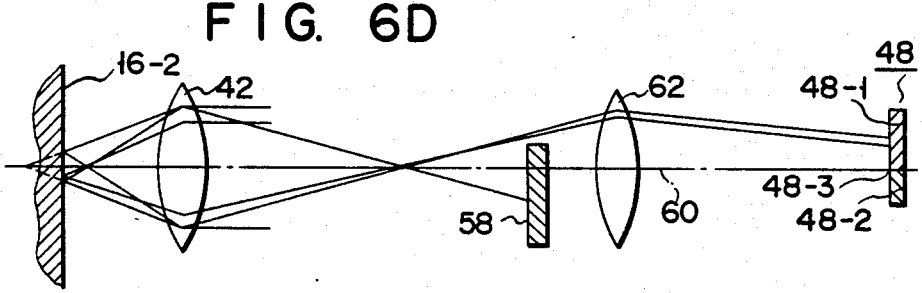
Figure 8:
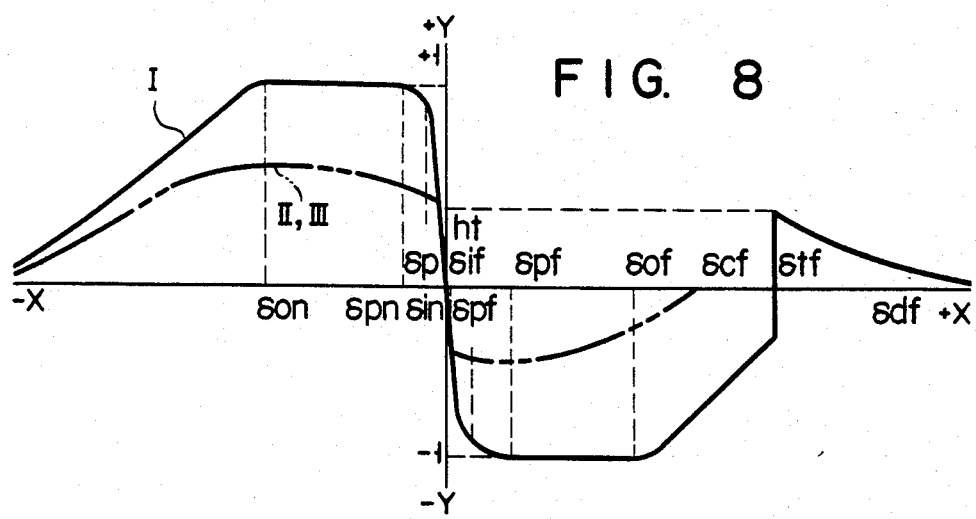
FIG. 8 is a graph showing the differential signal from a subtractor used as a focusing signal generator as a function of defocusing deviation $\delta$.
Figure 9:
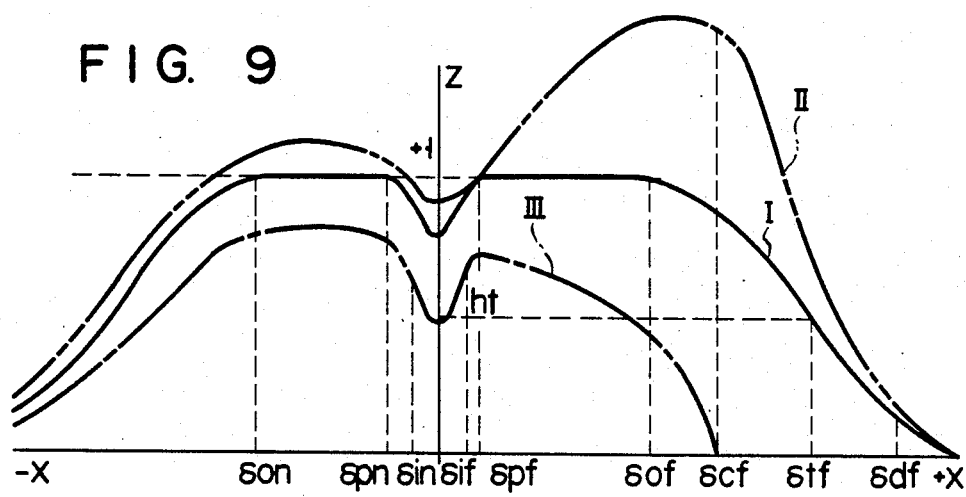
FIG. 9 is a graph showing the sum signal from an adder as a focusing signal generator as a function of defocusing deviation $\delta$.

Changes in the sum signal and the differential signal corresponding to the position of the objective lens 42, i.e., to the defocusing value, will be described in detail with reference to FIGS. 8 and 9. Both signals are obtained from the photo signals from the second photo detecting unit 48 in the focus detecting system, i.e., in the knife edge method shown in FIGS. 4, 5 and 6A to 6D. FIG. 8 shows the relationship between a differential signal Y and a defocusing displacement X, and FIG. 9 shows the relationship between a sum signal Z and the defocusing displacement X. Referring to FIGS. 8 and 9, the distance between the current position of the objective lens and that in the just in-focusing state, hence, the defocusing displacement X, is plotted along the axis of abscissa. Note $+X$ denotes the distance between the current position of the objective lens 42 and that in the just in-focusing state in the direction away from the light reflecting layer 16-2, and $-X$ denotes the distance between the current position of the objective lens 42 and that in the just in-focusing state in the direction toward the light reflecting layer 16-2. Y and Z plotted along the axis of ordinate respectively denote the levels of the differential signal from the subtractor 96 and the sum signal from the adder 94 with reference to the saturation level indicated by curve I. The curve I indicated by the solid line corresponds to the case wherein the edge of the light shielding plate 58 substantially coincides with the optical axis 60. Curve II corresponds to the case wherein the edge of the light shielding plate 58 is displaced from the optical axis 60 to interrupt light rays at a distance from the optical axis 60. Curve III corresponds to the case wherein light rays passing along the optical axis 60 are not interrupted by the plate 58. As can be seen from the curve I of FIG. 8, the rise characteristics of the defocusing signal corresponding to the defocusing displacement X are abrupt near the just in-focusing position ($X=0$), as compared with other defocusing detection methods. The level of the defocusing signal reaches 80% of the saturation level at the position $\delta if$ or $\delta in$ of the defocusing displacement, and is saturated at the position $\delta pt$ or $\delta pn$ thereof. In addition, when slight defocusing occurs, the beam spot on the photo detecting unit is enlarged to extend outside the photo sensitive regions of the photo detecting unit at the position $\delta of$ or $\delta on$. Therefore, when defocusing occurs at a position outside the positions $\delta of$ and $\delta on$, a sum Z of the defocusing signal Y and the amount of the detected light is reduced in proportion of the area of the beam spot extending outside the photo sensitive regions of the photo detecting unit. However, when the objective lens 42 is spaced further apart from the light reflecting light 16-2 of the optical disk 14 than the predetermined distance, the laser beam directed from the objective lens 42 to the projection lens 62 is converged therebetween, as shown in FIG. 6D, so that the divergent laser beam becomes incident on the projection lens 62, as in the case of FIG. 6B. Therefore, the laser beam covergeed by the projection lens 62 is projected onto the first photo sensitive region 48-1 of the photo detecting unit 48 so that the focusing signal from the subtractor 96 changes in the positive direction at the position $\delta rf$, as indicated by the curve I of FIG. 8. This means that the same focusing signal as that in the case wherein the objective lens 42 is too close to the optical disk 14 may be erroneously generated even though the objective lens 42 is spaced apart from the optical disk 14. For this reason, the defocusing allowance must be kept within the range defined by the distance $\delta tf$ on the characteristic curve I. As is easily seen from FIG. 9, while the objective lens 42 is in the just in-focusing state, the beam spot is formed on the photo insensitive region 48-3 of the photo detecting unit 48 so that the level Z of the sum signal becomes lower.

As is apparent from a comparison of curves I, II and III of FIG. 8, when the edge of the light shielding plate 58 substantially coincides with the optical axis 60, the level of the differential signal is inverted at a transition point corresponding to a distance $\delta tf$. However, when the light shielding plate 58 is arranged such that the optical axis 60 extends through the light shielding plate 58 and the light rays passing in a space extending from the edge of the light shielding plate 58 to the optical axis 60 are shielded by the plate 58, or when the light shielding plate 58 is arranged such that the edge of the light shielding plate 58 is separated from the optical axis 60 and the light rays passing through a space between the edge and the optical axis 60 are projected on the projection lens 62, the level of the differential signal is not inverted at the transition point $\delta tf$, as indicated by the curves II and III. From this, it is concluded that the light shielding plate 58 is preferably arranged such that its edge is inserted in the laser beam path so as to cause the edge to cross the optical axis 60 or that the edge is inserted in the laser beam path so as not to cause the edge to reach the optical axis 60. When the light shielding plate 58 is slightly inserted in the laser beam path to shield ⅓ or less of the laser beam, and ⅔ of the total laser beam is projected onto the photo detector 48, the focus servo loop cannot be stably operated. The just in-focusing state or the defocusing state cannot then be properly detected. This was confirmed by experiment, and is because the optical head is erroneously operated since diffraction patterns appear in the photo sensitive regions 48-1 and 48-2 in accordance with a defect (e.g., dust in the optical path), warping of the optical disk or a tracking guide formed on the optical disk 14. However, when the light shielding plate 58 is deeply inserted in the laser beam path, most of the light beams are shielded by the plate 58 to decrease the intensity of beams incident on the photo detector 48. For this reason, even if the laser beam spot on the photo detector 48 is disturbed by dust in the optical path, scratching or warp of the optical disk and the diffraction pattern from the tracking guide pregroove, this will not be detected as the defocusing state. This was confirmed in the following manner.

The light shielding plate or knife edge 58 was inserted in the optical path at different depths. Under this condition, data concerning focusing signals from the focusing signal generator 68 were acquired when the optical disk on the turntable was slightly inclined together with the turntable. When ¾ of the laser beams reflected by the light reflecting layer 16-2 of the optical disk 14 and passing through the objective lens 42 were shielded by the light shielding plate 58, the just in-focusing state was not substantially detected to be the defocusing state even if the optical disk was slightly inclined, as compared with the case wherein ½ of the laser beams were shielded by the plate 58. Experimentally, no problem occurred even if the optical disk 14 was inclined at 100 μm/cm. The same experiment was performed in an optical system wherein the light shielding plate 58 was located between the projection lens 62 and the photo detector 48, or another optical system wherein a bi-prism was used in place of the light shielding plate 58. According to this experiment, it was found that ⅓ or less, or preferably ¼ or less of the laser beam reflected by the light reflecting layer 16-2 is transmitted to the photo detector 48.

As is apparent from the above description, when a difference between the sum signal level from the adder 94 at the time when the focusing servo loop is closed within the range defined by the distance δtf on the characteristic curve I and a sum signal level ht from the adder 94 at the time when the objective lens 42 is located at the transition point δtf is small (i.e., when the level of the sum signal ht at the transition distance δtf is not sufficiently small), the CPU 74 cannot supply the ON signal to the switching circuit 70 within the range defined by the distance δtf. However, the CPU 74 may supply the ON signal to the switching circuit 70 outside this range. In particular, when it is considered that the detection sensitivity of the photo detectors 48 and 52 is not kept constant in all systems and that the optical disk 14 itself does not have a uniform reflectance over the entire region thereof, in order to cause the CPU 74 to accurately detect that the objective lens 42 has reached the defocusing allowance distance within the distance δtf, the level ht of the sum signal at the transition point δtf must be less than 50% of a saturation level hs. When the level ht of the sum signal at the transition point δtf falls within 50% of the saturation level hs, the CPU 74 can accurately detect that the objective lens 42 has entered within the limits of the defocusing allowance. In order to cause the level ht of the sum signal at the transition point δtf to fall within 50% of the saturation level hs, half or less of the total area of the beam spot on the photo sensitive regions 48-1 and 48-2 at the time when the objective lens 42 is located at the transition point δtf is located on the regions 48-1 and 48-2, and another half or less of the beam spot is located outside the regions 48-1 and 48-2. When the area of the beam spot within the regions 48-1 and 48-2 and the area of the beam spot outside thereof are respectively given to be Sin and Sout, the condition Sout ≥ Sin must be satisfied at the transition point δtf. In general, the light intensity distribution of the beam spot is not uniform. The center of the spot has the highest intensity, and the intensity gradually decreases toward its periphery. In addition, the optical disk 14 does not have a uniform reflectance throughout the entire area thereof. When these points are also considered, the level ht of the sum signal at the transition point δtf is required to be less than 25% (i.e., ht ≤ 0.25 hs). The area Sin of the beam spot within the regions 48-1 and 48-2 is required to be substantially ⅓ or less of the area Sout of the beam spot portion outside the regions 48-1 and 48-2 (i.e., Sout ≥ 3 Sin).

The size of the photosensitive regions 48-1 and 48-2 which satisfies the above conditions will now be described.

Figure 10:
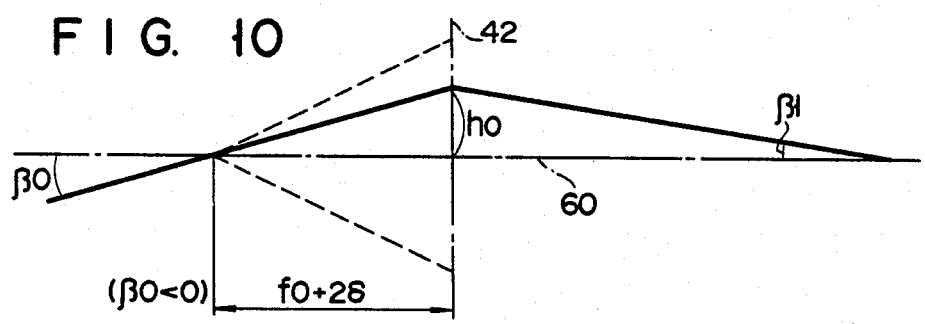
FIG. 10 is a view showing the geometric path of light from a light source passing through the objective lens shown in FIG. 5.

A change in the path of the laser beam can be explained geometrically/optically as follows. A deviation h2 of the laser beam component on the photo detecting unit 48 from the optical axis can be determined. The geometric/optical imaging system of the objective lens 42 is as illustrated in FIG. 10. Referring to FIG. 10, f0 represents the focal length of the objective lens 42 and δ represents the defocusing displacement of the objective lens 42, that is, a change in the distance thereof when a change from the just in-focusing state to the defocusing state is made. In FIG. 10, the laser beam path indicated by the solid line emerges from the beam waist, passes through a point on the principal plane of the objective lens 42 which is a distance h0 away from the optical axis 60, and is focused. In the just in-focusing state shown in FIG. 6A, δ=0. In the defocusing state shown in FIG. 6B, the objective lens 42 draws closer to the optical disk 14 by the displacement distance δ. Since the beam waist is formed by the laser beam reflected from the light reflecting layer 16-2, the beam waist comes closer to the objective lens 42 by double the displacement distance δ (in this case, δ<0). In the defocusing state shown in FIG. 6C, the objective lens 42 is spaced further apart from the optical disk 14 by the displacement distance δ, and the laser beam is reflected from the light reflecting layer 16-2 after the beam waist is formed. Accordingly, this is basically similar to the state wherein the beam waist is formed behind the light reflecting layer 16-2. Thus, the beam waist is spaced apart from the objective lens by the distance 2δ. In the just in-focusing state, if the beam waist is formed at the focal point of the objective lens 42 and the objective lens 42 is then moved further apart from the optical disk 14 by the distance δ, the distance between the beam waist and the principal plane of the objective lens 42 is represented by (f0+2δ). When the beam waist is regarded as a point, angles $\beta 0$ and $\beta 1$ shown in FIG. 10 are given by equations (1) and (2) below:

$$h0/(f0+2\delta) = \tan(-\beta 0) \approx -\beta 0 \quad (1)$$

From the lens imaging theorem, $$\tan(-\beta 0)/h0 + \tan\beta 1/h0 = 1/f0$$

Therefore, $$\beta 1 = \beta 0 + h0/f0 \quad (2)$$
$$= h0/(f0 + f0^2/2\delta)$$

Figure 11:
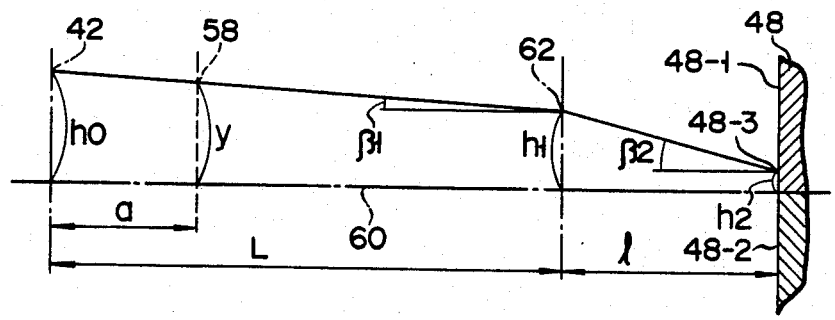
FIG. 11 is a view showing the geometric path of light from a light source passing through a projection lens system shown in FIG. 5.

FIG. 11 shows the geometric path of light in the optical system of the projection lens 62. It is also assumed that the respective lens 62 has a focal length f1, the light shielding plate 58 is arranged at a diatance a from the principal plane of the objective lens 42, the principal plane of the lens 66 is arranged at a distance L from that of the objective lens 42, and the principal plane of the lens 62 is arranged at a distance l from the regions 48-1, 48-2 and 48-3 of the photo detecting unit 48. The path indicated by the solid line is the path of light rays which are converged by the objective lens 42 and which then pass through the light-transmitting plane of the light shilding plate 58 the edge of which is apart from the optical axis by a distance y.

The distance y is given by equation (3) below:

$$y = h0 - a\beta 1 \quad (3)$$
$$= h0\{1 - a \cdot 1/(f0 + f0^2/2\delta)\}$$

If it is assumed that $F(\delta) = (f0 + f0^2/2\delta)^{-1}$, equation (3) can be rewritten as:

$$y = h0(1 - aF(\delta)) \quad (4)$$

Therefore, $$h0 = y/(1 - aF(\delta)) \quad (5)$$

A distance h1 of the path of the transmitted light component from the optical axis 60 at the principal plane of the lens 62 is given by equation (6) below:

$$h1 = y - (L-a)\beta 1 \quad (6)$$
$$= \{(1 - LF(\delta))/(1 - aF(\delta))\} \cdot y$$

Angle $\beta 2$ can be calculated in a similar manner as in the case of angle $\beta 1$ in equation (2) as follows:

$$\beta 2 = \beta 1 + h1/f1 \quad (7)$$
$$= \{y/(1 - aF(\delta))\}\{1/f1 + (1 - L/f1)F(\delta)\}$$

The distance or deviation h2 from the optical axis 60 of the transmitted light component at the photo region of the photo detecting unit 48 is given by equations (8) and (9) below:

$$h2 = h1 - l\beta 2 \quad (8)$$
$$= \{y/(1 - aF(\delta))\}\{(1 - l/f1) - [l + L(1 - l/f1)] \times F(\delta)\}$$

When l=f, equation (8) can be rewritten as:

$$h2 = -y \cdot f1 \cdot F(\delta)/\{1 - aF(\delta)\} \quad (9)$$
$$= \mp m f0 y/\{(a - f0) - f0^2/2\delta\}$$

Note that m is a transverse magnification factor and is obtained from $\pm m = -\beta 0/\beta 2$. Thus, $+m$ represents the case of inverted image, and $-m$ represents the case of an erect image.

In the optical system shown in FIG. 10, it is assumed that the beam waist is formed at the focal point of the objective lens 42. However, when a divergent or convergent laser beam is incident on the objective lens 42, the position of the beam waist is deviated from the focal point of the objective lens 42 by a distance b.

Figure 12:
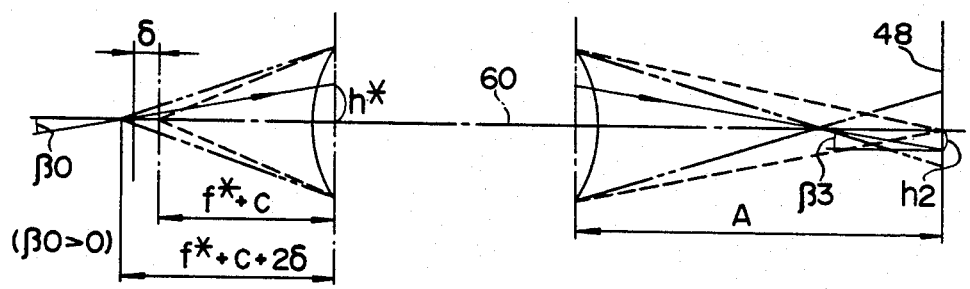
FIG. 12 is a view showing the geometric path of light when the lenses shown in FIGS. 10 and 11 are replaced with a single synthetic lens.

When it is assumed that the lens system for processing the light which is reflected by the light reflecting layer 16-2 of the optical disk 14 and reaches the photo detecting unit 48 through the objective lens 42 and the projection lens 62 is a single compound lens, the calculation to be described below can be performed in place of the calculation described above. That is, the optical path of the reflected light obtained when the beam waist position is deviated from the focal point of the objective lens 42 by the distance $\delta$ is calculated in accordance with equations up to equation (9), assuming that the focal length of the single compound lens is f* and the distance from the front focal point of the single compound lens to the optical disk 14 when the just in-focusing state is established (focused laser beam) is C. When the objective lens 42, a projection lens 62, and the like are all considered as a single synthetic lens, we have from FIG. 12:

$$h^*/(f^* - C + 2\delta) = \tan(-\beta 0) \approx -\beta 0$$

Thus, $$h^* = -\beta 0 \cdot (f^* + C + 2\delta) \quad (10)$$

Also, $$\beta 2 = \beta 0 + h^*/f^* = \{\beta 0 - \beta 0 - (C + 2\delta)\beta 0/f^*\} \quad (11)$$
$$= -\beta 0(C + 2\delta)/f^*$$

When the second photo detecting unit 48 is arranged at the image forming plane when the focused point of the laser beam and the position of the light reflecting layer 16-2 of the optical disk 14 coincide with each other (when $\delta = 0$), we have h2=0. The transverse magnification factor m at this time is obtained from $$\pm m = -\beta 0/\beta 2 \text{ to be } m = \pm f^*/C.$$

Therefore, $$C = \pm f^*/m \quad (12)$$

Note that m is assumed to be always a positive number. Thus, $+m$ represents the case of an inverted image, and $-m$ represents the case of an erect image.

When the distance from the rear principal point of the compound lens to the second photo detecting unit 70 is represented by A, we have:

$$h2 = h^* - A\beta 2 \quad (13)$$

-continued $$= \beta 0\{(\pm A/m - f^* \mp f^*/m) + (A/f^* - 1) \times 2\delta\}$$

For any value of $\beta 0$ and for $\delta = 0$, from $h2 = 0$, we have:

$$A = f^*(1 \pm m) \quad (14)$$

Substitution of equation (14) in equation (13) provides:

$$h2 = \beta 0\{f^*(1 \pm m)/f^* - 1\} \times 2\delta \quad (15)$$
$$= \pm 2m\delta \times \beta 0$$

Substitution of equations (1) and (5) in equation (15), following equations (16) and (17) are established.

$$h2 = \mp mf0y/(a - f0 - f0^2/2\delta) \quad (16)$$

$$h2 \pm (2my/f0)\delta \quad (17)$$

Figure 13:
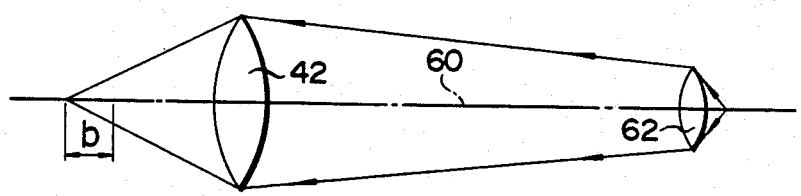
FIG. 13 is a diagram showing the path of the light when the beam spot or waist is not formed at the focal point of the objective lens but at a position deviated slightly therefrom.

As shown in FIG. 13, when laser beam incident on the objective lens 42 is convergent or divergent, and the focused point of the laser beam is deviated from the focal point of the objective lens 42 by the distance b, conversion in equations (1) to (9) of:

$$2 \to 2\delta + b$$

allows establishment of the proper equations. Accordingly, from equation (5), we have:

$$h0 = \{[f0 + f0^2/(2\delta + b)]/[f0 + f0^2/(2\delta + b) - a]\} \times y \quad (18)$$

Substitution of equation (18) in equation (1) yields:

$$\beta 0 = -h0/(f0 + 2\delta + b) \quad (19)$$
$$= -[f0 \cdot h0/(2\delta + b)]/[f0 + f0^2/(2\delta + b)]$$
$$= f0 \cdot y/\{(2\delta + b)[f0 + f0^2/(2\delta + b) - a]\}$$
$$= -f0 \cdot y/\{f0^2 + (f0 - a)(a\delta + b)\}$$
$$= -y/\{f0 + (1 - a/f0)(2\delta + b)\}$$

Substitution of equation (12) in equation (15) provides:

$$h2 = \mp 2my\delta/\{f0 + (1 - a/f0)(2\delta + b)\} \quad (20)$$

if $a = 0$, $$h2 = \mp 2my\delta/(f0b + 2\delta) \quad (21)$$

if $f0 + b \gg 2\delta$, $$h2 \approx \mp 2my\delta/(f0 + b) \quad (22)$$

Equations (9), (10), (13), (15), (16) and (17) indicate that when the focal point of the objective lens 42 is deviated from the light reflecting layer 16-2 of the optical disk 14 by the distance $\delta$, the beam spot formed on the photo sensitive regions 48-1 and 48-2 of the photo detecting unit 48 is geometrically deviated from the optical axis 60 for the distance h2.

In the above embodiment, the second photo detecting unit 48 is arranged at the convergent point of the optical disk 14 on the light reflecting layer 16-2. However, a case will now be described wherein the second photo detecting unit 48 is arranged at a position slightly shifted from the convergent point of the optical disk 14 on the light reflecting layer 16-2. Equations representing the optical behavior in this case will first be described.

The overall optical system will be considered as a compound lens. In the just in-focusing state, that is, when the focal point of the objective lens 42 coincides with the light reflecting layer 16-2 of the optical disk 14, the distance A0 between the rear principal point of the compound lens and the focal point thereof is given from equation (14) by:

$$A0 = f^*(1 \pm m) \quad (23)$$

where m is the transverse multiplication factor and $f^*$ is the focal length of the compound lens. When the photo detecting unit is located at a position at a distance A toward the compound lens from the focal point, the distance A1 between the rear principal point of the compound lens and the photo detecting unit 48 is given by:

$$A1 = A0 - \Delta \quad (24)$$
$$= f^*(1 \pm m) - \Delta$$

When equation (24) is substituted in equation (20), we have:

$$h2 = h^* - A\beta 2 \quad (25)$$
$$= \beta 0\{\mp \Delta/m - (\mp m \mp \Delta/f^*) \cdot 2\delta\}$$

Substitution of equation (19) in this equation provides:

$$h2 = \{\mp \Delta/m - (\mp m + \Delta/f^*) \cdot 2\delta\} \cdot \{y/f0 + (1 - a/f0)(2\delta + b)\} \quad (26)$$

This equation (26) can be applied to a relatively wide range of optical systems for defocusing detection, and can be used as a general formula. When it is assumed that $\Delta = 0$ equation (20) is obtained.

A value of the transition distance $\delta t f$ shown in FIG. 8 is calculated when a distance between the rear principal point of the objective lens 42 and the light shielding plate 58 is set to be K. When a distance between the rear principal point of the objective lens 42 and the front principal point of the projection lens 62 is given to be L and the condition $L \geq K$ is given, equation (6) yields equations (27) and (28):

$$0 = y\{1 - K/(f0 + f0^2/2\delta t f)\} \quad (a = 0) \quad (27)$$

therefore, $$\delta t f = f0^2/\{2(K - f0)\} \quad (28)$$

However, when $L < K$ is established, if $h2 = 0$, $a = 0$ and $H = K - L$ are given in equation (8), we have $$1 - (K-L)/f1 = [(K-L) + L\{1 - (K-L)/f1\}] \times 1/(f0 + f0^2/2\delta t f) \quad (29)$$

therefore, equation (29) is rewritten with respect to $\delta t f$ as follows:

$$\delta t f = (f0^2/2)[\}f1(K-L)\}/(f1 - K + L) + L - f0]^{-1} \quad (30)$$

where f1 is the focal length of the projection lens 62 of FIG. 4. The size of the beam spot on the photo detector 48 is calculated when the defocusing occurs by only $\delta tf$ given by equation (28) or (30). Assume the optical system having the characteristic curve I of FIG. 8. In this case, a semi-circle having a radius R is given. The radius R is derived from equation (26) when $a = b = 0$ and $y = A$ (where A is the radius of the aperture or the exit pupil of the objective lens 42) are given:

$$R = |\{\mp \Delta/m + (\pm m + \Delta/f'') \times 2\delta tf\} \times A/(f0 + 2\delta tf)| \qquad (31)$$

Assume that the photo sensitive regions of the photo detector 48 have a radius r. A maximum value rmax of the radius r of the photo sensing regions which satisfies condition Sin $\leq$ Sout for $\delta = \delta tf$ is calculated. Since only half of the area of the photo detector 48 is irradiated with light when $\delta = \delta tf$, the following equation is established:

$$\pi r_{max}^2 = \pi R^2/2 \qquad (32)$$

In order to satisfy condition Sin $\leq$ Sout for $\delta = \delta tf$, the photo sensitive regions of the photo detector 48 must have a smaller area than a circle having the radius rmax given by:

$$r_{max} = R/\sqrt{2} \qquad (33)$$
$$= [|\{\mp \Delta/m + (\pm m + \Delta/f'') \times 2\delta tf\} \times A/(f0 + 2\delta tf)|]/\sqrt{2}$$

A maximum radius rmax' of the radius of the photo sensing regions to satisfy condition Sout $\beta$ 3Sin for $\delta = \delta tf$ is given as follows:

$$\pi r_{max}'^2 = \pi R^2/4 \qquad (34)$$

When the area of the photo sensing regions is smaller than that of a circle having the radius rmax' as follows:

$$r_{max}' = [|\{\mp \Delta/m + (\mp m + \Delta/f'') \times 2\delta tf\} \times A/(f0 + 2\delta tf)|]/2 \qquad (35)$$

the condition Sout $\geq$ 3Sin is satisfied for $\delta = \delta tf$.

The relationship between the position of the light shielding plate 58 and the transition point $\delta tf$ in the graph of FIG. 5 will now be described. The light shielding plate 58 may be located between the objective lens 42 and the projection lens 62, or between the projection lens 62 and the photo detector 48. In the former case, the distance between the rear principal point of the objective lens 42 and the light shielding plate 58 is given to be X1. In the latter case, the distance between the rear principal point of the objective lens 42 and the light shielding plate 58 is given to be X2. Under these assumptions, when the objective lens is defocused by the transition defocusing distance $\delta tf$, the laser beam forms a convergent point on the optical axis at the position where the light shielding plate 58 is located. Therefore, when the light shielding plate 58 is located between the objective lens 42 and the projection lens 62, the distance X1 is obtained when h1 = 0, a = 0 and L = X1 are substituted in equation (6) as follows:

$$0 = y\}1 - X1/(f0 + f0^2/2\delta tf)\}$$

therefore, $$X1 = f0 + f0^2/2\delta tf$$

However, when the light shielding plate 58 is located between the projection lens 62 and the photo detector 48, X2 is obtained when h2 = 0, a = 0 and $L + H = X2$ are substituted in equation (8) as follows:

$$0 = y\{(1 - H/f1) - (X2 - LH/f1) \times 1/(f0 +$$
$$f0^2/2\delta tf)\} = y\{(1 - H/f1) - \{X2 + (HX2 - L^2)/f1\} \times$$
$$1/(f0 + f0^2/2\delta tf)] = y\{(1 - H/f1) - \{X2(1 - H/f1) + L^2/f1\} \times$$
$$1/(f0 + f0^2/2\delta tf)] = y(1 - H/f1)[1 - \{X2 + L^2/(f1 - H)\} \times$$
$$1/(f0 + f0^2/2\delta tf)]$$

therefore, $$X2 = f0 + f0^2/2\delta tf - L^2/(f1 - H)$$

Normally, $f1 < H$ is established, so that the relation $X1 < X2$ is constantly established. When the value $\delta tf$ is too small in the graph of FIG. 8, the defocusing detection signal is inverted for a short transition defocusing distance, resulting in inconvenience.

The defocusing allowance Z will now be considered. More particularly, the position of the light shielding plate 58 will be considered to set the transition defocusing distance $\delta tf$ to be longer than the defocusing allowance Z.

When a pit is formed in the light reflecting layer 16-2 of the optical disk to record information, proper recording cannot be performed when a beam spot on the light reflecting layer 16-2 is increased due to the defocusing state. A spot size al on the light reflecting layer 16-2 in the just in-focusing state is given by:

$$al = 0.82\lambda/NA$$

(where $\lambda$ is the wavelength of the laser beam and NA is the numerical aperture). In this case, the intensity distribution is similar to the Gaussian distribution. If a radius of a ring having an intensity $1/e^2$ of that at the center of the beam waist is given to be $\omega 0$, a radius $\omega(Z')$ on the light reflecting layer 16-2 which is deviated by Z' from the ring (i.e., the radius of a ring where the defocusing distance Z' is given) is calculated as follows:

$$\omega(Z') = \omega 0 \sqrt{1 + (\lambda Z'/\pi \omega 0^2)^2}$$

therefore, $$\omega^2(Z') = \omega 0^2\{1 + (\lambda Z'/\pi \omega 0^2)^2\}$$
$$= \omega 0^2\{1 + ([NA]^2/0.17\pi\lambda)^2 Z^2\}$$

In this case, an intensity I at the center of the beam spot is decreased as follows:

$$I = \{\omega 0/\omega(Z')\}^2$$

When a minimum write intensity is given by $$I_{min} \leq \{1 + ([NA]^2/0.17\pi\lambda)^2 Z'^2\}^{-1}$$

This inequality can be rewritten as:

$$1 + ([NA]^2/0.17\pi\lambda)^2 Z'^2 \leq 1/Imin$$

$$([NA]^2/0.17\pi\lambda)^2 Z'^2 \leq -1/Imin - 1$$

therefore, $$|Z'| \leq 0.17\pi\lambda/(NA)^2 \sqrt{1/Imin - 1}$$

if $\lambda = 0.83$ μm, $NA = 0.6$ and $Imin = 0.7$, we have:

$$|Z'| \leq (0.44/0.36)/\sqrt{0.4286} = (0.44/0.36) \times 0.65$$

$$= 0.81 \text{ μm}$$

and if $\lambda = 0.83$ μm, $NA = 0.5$ and $Imin = 0.7$, we have:

$$|Z'| \leq (0.44 \times 0.65)/0.25 = 1.16 \text{ μm}$$

so that the defocusing allowance falls within the range between 0.5 and 2.0 μm. The maximum defocusing allowance is thus 2.0 μm. Therefore, the transition defocusing distance δtf must be not less than 2.0 μm. In addition, a maximum transition defocusing distance δtf of 2.0 μm is required to stably withdraw the objective lens 42. In the optical system in FIGS. 12 and 13, the condition $X2 < X1 \leq f0 + f0^2/2\delta tf$ must be satisfied, and the transition defocusing distance δtf must be not more than 2.0 μm.

In the optical system having the distance $F (= f0 + b)$ instead of the distance f0 between the front principal point of the objective lens 42 and the convergent point toward the optical disk, 2δtf is substituted by $2\delta tf + b = 2\delta tf + (F - f0)$ to obtain the same result $X2 < X1 \leq f0 + f0^2/2\delta tf + (F - f0)$. In this case, δtf is 2.0 μm. If $(F - f0) = b < 0$ is given, the relation $X1 > 0$ must be established. Therefore, the transition defocusing distance δtf becomes long. Only in this case, $2\delta tf + (F - F0)$ must be greater than +2.0 μm. The light beam reflected by the light reflecting layer (or recording layer) 16-2 of the optical disk and passing through the objective lens 42 has a divergent property in the just in-focusing state. For this reason, the light beam is not converged at the light shielding plate 58 unless the objective lens 42 is greatly defocused. In this case, the light beams are not converged until the light beams passing through the objective lens 42 become parallel. In addition, since the defocusing detection signal is not inverted within the defocusing allowance of 2.0 μm, $2\delta tf + (F - f0) \geq 2.0$ μm is established.

Optical components for extracting part of the laser beam are exemplified by a knife edge and a slit or aperture. However, any other optical components such as a prism, a mirror, a photo detector, ground glass, a lens or a light shielding plate can be used in place of these exemplified components. In this case, the above considerations must also be taken into account. Therefore, as used in the specification and claims, the term "light shielding means" encompasses all these structures and their equivalents.

The same consideration as described above can also be applied to an optical head employing an astigmatic system. An optical head using the astigmatic system will now be analyzed with reference to FIGS. 14 and 16. According to the astigmatism method, when the objective lens 42 is brought into the defocusing state and the convergent point (or beam waist) of the laser beam is deviated from the recording layer 16-2, the shape of the beam spot on the photo sensitive regions of the photo detector 48 is changed from a circle to an ellipse. The relationship between changes in dimensions of the beam spot along the major and minor axes of the ellipse on the photo sensitive regions with respect to the deviation δ between the convergent point of the laser beam and the recording layer is obtained. Note that the deviation δ in the objective lens 42 away from the optical disk 14 is defined to be positive ($\delta > 0$).

The following conditions are assumed before the actual calculation:

(a) Paraxial ray approximation (geometrical optics) is established.

(b) Parallel laser beams are incident on the objective lens 42 (the convergent point of the laser coincides with the front principal point of the objective lens 42).

(c) The objective lens 42 and the spherical or projection lens 62 are both thin lenses. A cylindrical lens 63 is assumed to also be a thin lens when the calculation is performed. After the calculation, a correction is made for the thickness of the cylindrical lens 63.

(d) The recording layer 16-2 of the optical disk 14 is regarded as a mirror surface.

(e) The size of the beam spot on the photo detector 48 is limited to the diameter A of the bundle of parallel light beams projected from the objective lens.

(f) When the objective lens 42 is kept in the just in-focusing state, the beam spot on the photo detector 48 has a circular shape.

Figure 14:
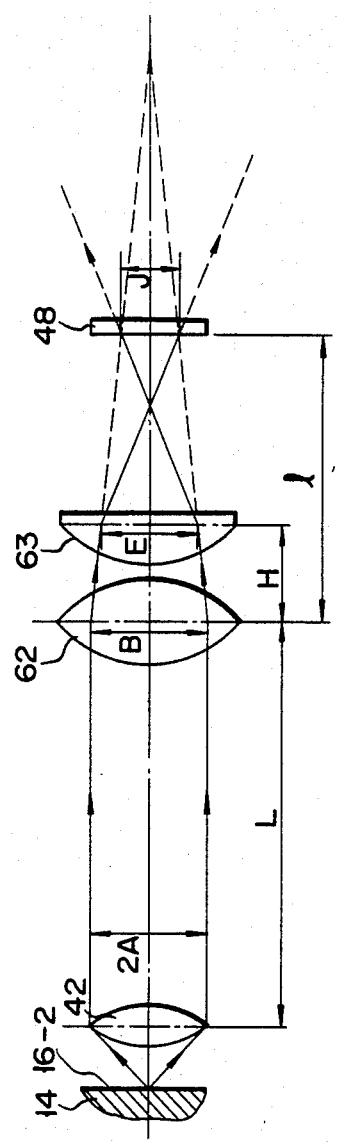
FIGS. 14 and 15 show an optical system of an optical head of the present invention adopting the astigmatism method.
Figure 15:
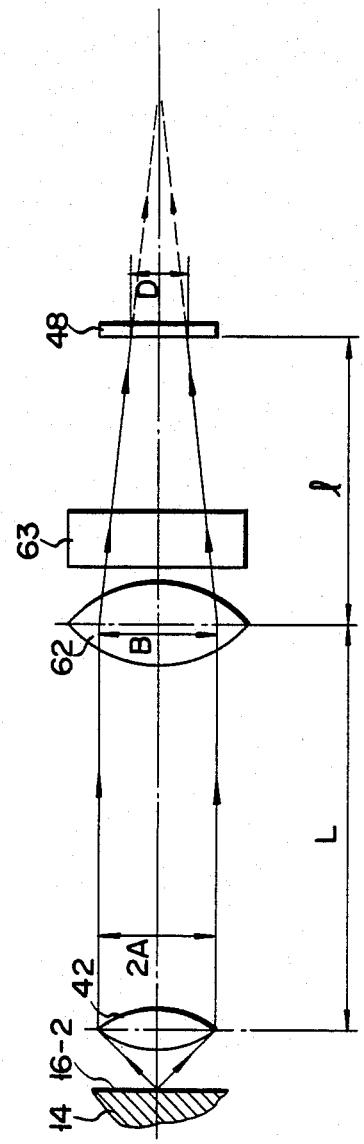

The laser beam reflected by the recording layer 16-2 of the optical disk, 15 and passing through the objective lens 42 has paths of FIGS. 14 and 15 along directions parallel to and perpendicular to the generator of the cylindrical lens 63. Referring to FIGS. 14 and 15:

D: the size of the beam spot converged on the photo detector 48 by only the spherical lens 62

J: the size of the beam spot converged on the photo detector 48 by a compound lens consisting of the spherical lens 62 and the cylindrical lens 63

B: the spot size on the spherical lens 62

E: the spot size on the cylindrical lens 63

A: the radius (aperture of the objective lens 42) of the bundle of parallel beams F0: the focal length of the objective lens 42 f1: the focal length of the spherical lens 62 f2: the focal length of the cylindrical lens 63

L: the distance between the objective lens 42 and the spherical lens 62

H: the distance between the spherical lens 62 and the cylindrical lens 63 l: the length of the optical path between the spherical lens 62 and the photo detector 48

(δ: the defocusing deviation)

Following equations (36) to (38) are obtained from the equation (8):

$$D = 2A\{(1 - l/f1) - [l + L(1 - l/f1)] \times 1/(f0 + f0^2/2\delta)\} \quad (36)$$

$$D \approx 2A\{(1 - l/f1) - [l + L(1 - l/f1)] \times 2\delta/f0^2\} \quad (37)$$

$$J = 2A\{[(l - H)(1 - H)/f2 - (1 - l/f1)] + \quad (38)$$

$$[l + L(1 - l/f1) - H(l - H)/f2 -$$

$$L(l - H)(1 - H)/f1f2] \cdot [1/(f0 + f0^2/2)]\}$$

When the just in-focusing state is obtained, the shape of the beam spot on the photo detector 48 is circular, so that the condition $D = J$ for $\delta = 0$ is substituted in equations (36) and (38), the following equation is derived:

$$1 - l/f1 = (l-H)(f1-H)/f1/2 - (1-l/f1)$$

therefore, $$f2 = (f1-H)(l-H)/2(f1-l) \quad (39)$$

Substitution of equation (39) in equation (38) yields:

$$J = 2A\{(1 - l/f1) + [l - L(1 - l/f1) - \quad (40)$$

$$2H(f1 - l)/(f1 - H)] \cdot 1/(f0 + f0^2/2)\}$$

$$J \approx 2A\{(1 - l/f1) + [l - L(1 - l/f1) - \quad (41)$$

$$2H(f1 - l)/(f1 - H)] \cdot [2\delta/f0^2]\} \text{ for } \delta = 0$$

Figure 16:
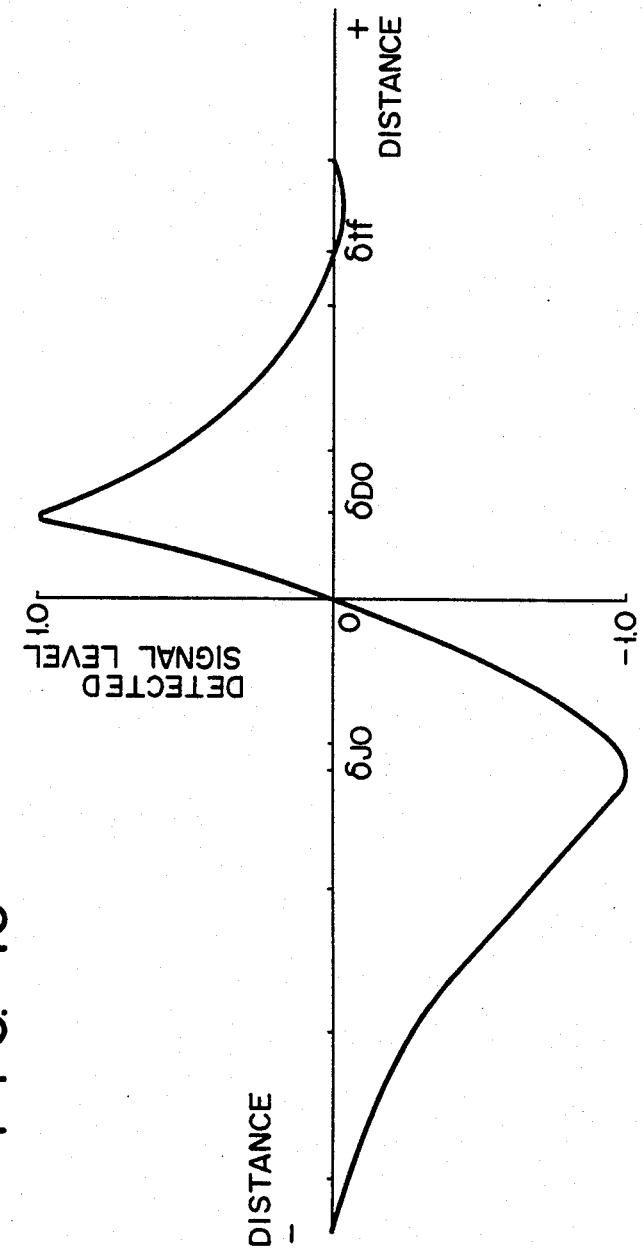
FIG. 16 is a graph showing a focusing signal obtained from a photodetector shown in FIGS. 14 and 15.

By utilizing equations (36), (39) and (40), the optical system employing the astigmatism method can be suitably designed. When the detailed features of the optical system are examined after the respective parameters of the optical system have been determined, the defocusing deviation (the distance between the convergent point of the laser beam and the recording layer of the optical disk) is plotted along the abscissa and the corresponding defocusing deviation detection signal is plotted along the ordinate, as shown in FIG. 16.

(i) The defocusing deviation $\delta$ when the defocusing deviation detection signal shown in FIG. 16 becomes maximum is obtained as follows.

(a) $\delta D0$ for $D=0$ $D=0$ is substituted in equation (36) and this equation is solved for $\delta$ to obtain:

$$\delta D0 = f0^2/2 \times (L - f0 + l/(1-l/f1))^{-1} \quad (42)$$

(b) $\delta J0$ for $J=0$ $J=0$ is substituted in equation (40) and this equation is solved for $\delta$ to obtain:

$$\delta J0 = f0^2/2 \times (L + 2H - f0 - l/(1-l/f1))^{-1} \quad (43)$$

(ii) Defocusing deviation $\delta tf$ when the defocusing deviation detection signal is set at level 0 even if the defocusing state occurs is obtained as follows.

$\delta = \delta tf$ is obtained for $-D = J$, so that the defocusing amount $\delta tf$ is derived from equations (36) and (40) as follows:

$$\delta tf = f0^2/2 \times \{L \times f1H/(f1-H) - f0\}^{-1} \quad (44)$$

In the optical system for using the astigmatism method as a method of detecting the defocusing state, the defocusing detection signal is inverted when the defocusing amount $\delta tf$ is given as follows:

$$\delta tf = f0^2/2 \times \{L + f1H/(f1+H) - f0\}^{-1} \quad (45)$$

Equation (45) is rewritten as:

$$1/(f0 + f0^2/2\delta tf) = \{L + f1H/(f1+H)\}^{-1} \quad (46)$$

Substitution of equation (46) into equation (36) yields:

$$D = \{2A(H-l)/\{L(1-H/f1)+H\} \quad (H<l) \quad (47)$$

When the defocusing detection signal in accordance with the astigmatism method is inverted (i.e., $\delta = \delta tf$), the beam spot on the photo detector 48 has a circular shape having the following radius:

$$R = \{A(l-H)\}/\{L(1-H/f1)+H\} \quad (48)$$

In order to satisfy the condition Sin $\leq$ Sout for $\delta = \delta tf$ in the same manner as in the optical system of FIG. 4 in accordance with equation (32), the radius of the photo sensitive regions of the photo detector 48 for detecting the defocusing state must be smaller than the circuit having the following radius:

$$rmax = A(l-H)/\sqrt{2} \{L(1-H/f1)+H\} \quad (49)$$

In order to safisfy the condition Sout $\geq$ 3Sin for $\delta = \delta tf$ in accordance with equation (34), the radius of the photo sensitive regions of the photo detector 48 for detecting the defocusing state must be smaller than the circuit having the following radius:

$$rmax' = \{A(l-H)\}/2\{L(1-H/f1)+H\} \quad (50)$$

(i) The differential signal ht for detecting the defocusing state when the defocusing signal is inverted in FIG. 5 has a small value. When the defocusing detection signal Y becomes larger than ht (e.g., hs), the objective lens is detected to be located substantially at the just in-focusing state position.

(ii) When the differential signal ht can be minimized in FIG. 5, it is difficult to electrically detect the inversion region of a defocusing detection signal, thereby designing a defocusing detection apparatus having substantially no inversion characteristics.

(iii) Even if the objective lens 42 is accidentally deviated by a great amount and the defocusing amount exceeds $\delta tf$, while the defocusing correction circuit is operated normally (the negative feedback loop of defocusing detection is formed), the objective lens 42 will not be abruptly deviated even if the level of the differential signal ht in FIG. 5 is low.

What is claimed is:

1. An optical head for focusing a light beam on a light-reflecting surface comprising:

means for generating a light beam;

means for transferring the light beam;

objective lens means for (a) converting the transferred light beam into a convergent light beam with a beam waist, (b) projecting said convergent light beam on the light-reflecting surface, and (c) transmitting the light beam reflected from the light-reflecting surface;

means for moving said objective lens;

photo detector means having photo sensitive regions for receiving the reflected light beam, and for generating photo signals corresponding to the reflected light beam, said reflected light beam forming a beam spot which strikes said photo sensitive regions;

means for processing the photo signals and for generating a focusing signal having a first component which has a polarity and a second component which has an amplitude dependent on a position of said objective lens with respect to said light-reflecting surface, said first component of said focusing signal having a zero level when said objective lens is located at a predetermined transition point away from a predetermined position at which said objective lens is in a just in-focusing state, said beam spot extending outside the photo sensitive regions of said photo detector means when said objective lens means is located at said transition point to cause said second component to have a lower amplitude than when said objective lens is closer to said just in-focusing state than said transition point; and means, responsive to said first and second component of said focusing signal, for monitoring the position of said objective lens with respect to said transition point and for feedback controlling said moving means with said focusing signal when said objective lens is in a predetermined range closer to said just in-focusing state than said transition point and for disabling feedback control when said objective lens is further from said just in-focusing state than said transition point.

2. An optical head according to claim 1, wherein said photodetector means is dimensioned to cause an area Sin of a beam spot portion formed within the photo sensitive regions of said photo detector to be less than an area Sout of a beam spot portion formed outside the photo sensitive regions of said photo detector when said objective lens is located at the transition point.

3. An optical head according to claim 2, wherein the area Sout is larger than a value 3Sin which is three times the area Sin.

4. An optical head according to claim 1, further comprising:

light shielding means, located between said photo detector and said objective lens, for passing one part of the reflected light beam and shielding an other part of the reflected light beam; and projection lens means for projecting the reflected light beam on the photo sensitive regions of said photo detector.

5. An optical head according to claim 4, wherein the photo sensitive regions have a radius which is smaller than a radius rmax of a circle which is given as follows:

$$rmax = (\tfrac{1}{2})|\{\mp \Delta/m + (\pm m + \Delta/f^*) \cdot 2\delta tf\}(A/(f0 + 2\delta tf))|$$

wherein f0 is a focal length of said objective lens means, A is a radius of an aperture of said objective lens means, K is a distance between said objective lens means and said light shielding means and said projection lens means, m is an optical magnification of the reflected light beam at a convergent point of the reflected light beam projected from said projection lens in the just in-focusing state, $\Delta$ is a distance between said convergent point and said photo detector means, and f* is the focal length of a compound lens when said objective lens means and said projection lens means are regarded as comprising a single compound lens, provided that $$\delta tf = f0^2/2(K - f0)$$

for $L \geq K$ $$\delta tf = (f0^2/2)[\{f1(K-L)\}/\{(f1-K+L)\} + L - f0]^{-1}$$

for $L < K$ where f1 is a focal length of said projection lens means.

6. An optical head according to claim 4, wherein the photo sensitive regions have a smaller radius than a radius rmax of a circle which is given as follows:

$$rmax = (\tfrac{1}{2})|\{\mp \Delta/m + (\pm m + \Delta/f^*) \cdot 2\delta tf\}(A/(f0 + 2\delta tf))|$$

wherein f0 is a focal length of said objective lens means, A is a radius of an aperture of said objective lens means, K is a distance between said objective lens means and said light shielding means, L is a distance between said objective lens means and said projection lens means, m is an optical magnification of the reflected light beam at a convergent point of the reflected light beam projected from said projection len means in the just in-focusing state, $\Delta$ is a distance between the convergent point and said photo detector means, and f* is the focal length of a compound lens when said objective lens means and said projection lens means are regarded as comprising a single compound lens, provided that $$\delta tf = f0^2/2(K - f0)$$

for $L > K$ $$\delta tf = (f0^2/2)[\{f1(K-L)\}/\{(f1-K+L)\} + L - f0]^{-1}$$

for $L < K$ where f1 is a focal length of said projection lens means.

7. An optical head according to claim 1, further comprising means for deflecting the light beam directed from the objective lens means to said photo detector means.

8. An optical head according to claim 7, wherein one part of the reflected light beam projected from said objective lens means is projected by said deflecting means on said photo detector means, and the other part of said reflected light beam is not projected on said photo detector means.

9. An optical head according to claim 8, wherein said one part of the reflected light beam projected on said photo detector means has an intensity which is less than or equal to ⅓ of an intensity of the reflected light beam projected from said objective lens.

10. An optical head according to claim 8, wherein said one part of the reflected light beam projected on said photo detector has an intensity which is less than or equal to ¼ of an intensity of the reflected light beam projected from said objective lens means.

11. An optical head according to claim 1, further comprising light shielding means, located between said photo detector means and said objective lens means, for passing one part of the reflected light beam and shielding an other part of the reflected light beam.

12. An optical head according to claim 11, wherein said light shielding means is located to satisfy the following inequality $$X \leq f0 + f0^2/\{2\delta tf + (F - f0)\}$$

wherein f0 is a focal length of said objective lens means, F is a distance between a front principal point of said objective lens means and said beam waist of the transferred light beam converged by said objective lens means, X is the distance between a rear principal point of said objective lens means and said light shielding means, and $\delta tf$ is a distance between the predetermined position of said objective lens means in the just in-focusing state and the transition point.

13. An optical head according to claim 12, wherein a relation $2\delta tf = 2.0$ μm is established for $F - F0 \geq 0$.

14. An optical head according to claim 12, wherein a relation $2\delta tf + (F - f0) = 2.0$ μm is established for $F - f0 < 0$.

15. An optical head according to claim 1, further comprising compound lens means located between said objective lens means and said photo detector means and comprising a spherical lens and a cylindrical lens, for converging said reflected light beam and projecting a converged light beam on said photo detector means.

16. An optical head according to claim 15, wherein the photo sensitive regions of said photo detector means have a smaller radius than a radius rmax of a circle which is defined as follows:

$$rmax = (1/\sqrt{2})[A(l - H)/\{L(1 - H/f1) + H\}]$$

where A is a radius of an aperture (exit pupil) of said objective lens means, L is a distance between said objective lens means and said spherical lens, f1 is a focal length of said spherical lens, H is a distance between said spherical lens and said cylindrical lens, and l is a distance between said spherical lens and said photo detector means.

17. An optical head according to claim 15, wherein the photo sensitive regions of said photo detector means have a smaller radius than a radius rmax' of a circle which is defined as follows:

$$rmax' = (\tfrac{1}{2})[A(l-H)/\{L(1-H/f1)+H\}]$$

where A is a radius of an aperture (exit pupil) of said objective lens means, L is a distance between said objective lens means and said spherical lens, f1 is a focal length of said spherical lens, H is a distance between said spherical lens and said cylindrical lens, and l is a distance between said spherical lens and said photo detector means.

* * * * *